(12) United States Patent
Schulze et al.

(10) Patent No.: US 7,042,348 B2
(45) Date of Patent: May 9, 2006

(54) METHOD FOR MONITORING THE TIRE PRESSURE ON VEHICLES

(75) Inventors: Gunter Schulze, Ispringen (DE); Michael Frank, Bretten (DE)

(73) Assignee: Beru Aktiengesellschaft, Ludwigsburg (DE)

( * ) Notice: Subject to any disclaimer, the term of this patent is extended or adjusted under 35 U.S.C. 154(b) by 82 days.

(21) Appl. No.: 10/502,471

(22) PCT Filed: Jan. 17, 2003

(86) PCT No.: PCT/EP03/00439

§ 371 (c)(1),
(2), (4) Date: Jul. 22, 2004

(87) PCT Pub. No.: WO03/061995

PCT Pub. Date: Jul. 31, 2003

(65) Prior Publication Data

US 2005/0110623 A1    May 26, 2005

(30) Foreign Application Priority Data

Jan. 22, 2002   (DE) ................................. 102 03 335
Apr. 18, 2002   (DE) ................................. 102 17 239

(51) Int. Cl.
*B60C 23/00* (2006.01)

(52) U.S. Cl. ...................... 340/447; 340/442; 340/445; 340/446; 340/448

(58) Field of Classification Search ................ 340/422, 340/445, 446, 447, 448
See application file for complete search history.

(56) References Cited

U.S. PATENT DOCUMENTS

| | | | | |
|---|---|---|---|---|
| 5,285,189 A | * | 2/1994 | Nowicki et al. | ............ 340/447 |
| 5,963,128 A | * | 10/1999 | McClelland | ................ 340/447 |
| 6,087,930 A | * | 7/2000 | Kulka et al. | ................. 340/447 |
| 6,271,748 B1 | * | 8/2001 | Derbyshire et al. | ......... 340/442 |
| 6,445,286 B1 | * | 9/2002 | Kessler et al. | .............. 340/442 |
| 6,450,021 B1 | * | 9/2002 | Katou et al. | ................ 73/146.5 |
| 6,476,712 B1 | * | 11/2002 | Achterholt | ................... 340/447 |
| 2002/0075145 A1 | * | 6/2002 | Hardman et al. | ........... 340/442 |

FOREIGN PATENT DOCUMENTS

| | | |
|---|---|---|
| DE | 19856860 | 6/2000 |
| DE | 19939936 | 3/2001 |

* cited by examiner

*Primary Examiner*—Daniel Wu
*Assistant Examiner*—Hongmin Fan

(57) ABSTRACT

The invention describes a method for operating a device for monitoring and wireless signalling a pressure or a pressure change in pneumatic tires of wheels on vehicles, the device being hereinafter referred to as wheel electronics, wherein the pressure prevailing in the pneumatic tire is measured and electric pressure signals are derived from such measurements, and an information signal containing information on the pressure or on a pressure change is transmitted, the information signal being intended to be received by a receiver provided in or on the vehicle, the wheel electronics being set by a first control signal, which is transmitted in wireless fashion from outside the wheel electronics, to a first mode of operation in which the prevailing pressure or a pressure change is measured and signalled in response to the receipt of an interrogation signal generated outside the wheel electronics and transmitted to the wheel electronics in wireless fashion, and, if the wheel electronics do not receive another interrogation signal within a predetermined period of time after receipt of an interrogation signal, the wheel electronics adopting itself a second mode of operation in which the pressure or a pressure change is measured repeatedly and is transmitted at a transmission rate which is firmly preset or is variable and which is established in the wheel electronics for that second mode of operation.

20 Claims, 3 Drawing Sheets

METHOD FOR MONITORING THE TIRE PRESSURE ON VEHICLES

This application claims priority to Application number PCT/EP03/000439 filed on 17 Jan. 2003, Application number 102 03 335.8 filed on 22 Jan. 2002 filed with the German Patent and Trademark Office and Application number 102 17 239.0 filed on 18 Apr. 2002 filed with the German Patent and Trademark Office.

The invention relates to a method for monitoring and wireless signalling a pressure or a change of pressure in pneumatic tires on vehicles.

A method of that kind, and a corresponding device, are disclosed in DE 198 56 860 A1. The device disclosed by that publication comprises wheel electronics disposed inside the pneumatic tire and exposed to the pressure prevailing in that tire. The wheel electronics comprise a battery as a power source, a pressure sensor for measuring the pressure prevailing in the pneumatic tire, an electronic evaluation circuit for evaluating the measured pressure signals provided by the pressure sensor, and a transmitter controlled by the evaluation circuit and transmitting signals, which comprise an information on the pressure prevailing in the tire which is derived from the pressure measurement, to a receiver unit arranged in or on the vehicle. Commonly used pressure sensors consist of semiconductor-based absolute-pressure sensors, which provide an electric output signal corresponding to the respective current tire pressure. The receiver unit arranged in or on the vehicle is connected to a display device intended for signalling to the driver of the vehicle any occurrence of a dangerous drop in pressure and/or any other information on the condition of the tire.

Once the wheel electronics have been installed, battery changes are possible either not at all or only at significant cost. In order to keep energy consumption of the wheel electronics low, DE 198 56 860 A1 provides that the tire pressure information is transmitted by the wheel electronics at time intervals dependent on the vehicle speed. At a speed of more than 25 km/h, tire pressure data are sent out at time intervals of 54 seconds, for example, while with the vehicle travelling at lower speed or in stationary condition, they are sent out only at intervals of 15 minutes, for example. Adapting the transmission frequency in this way permits battery service lives of approximately seven years to be achieved.

In order to further increase the service life of the battery, DE 199 39 936 A1 teaches to provide the wheel electronics with a receiver capable of receiving an interrogation signal from an interrogation transmitter provided in or on the vehicle. Every time an interrogation signal is received the unit provided for this purpose is then caused to transmit tire pressure data. Thus, the energy-intensive transmission of tire pressure data will be initiated only when data regarding the tire pressure are actually needed. This especially permits to do without any transmission of pressure data while the vehicle is parked. It is, however, a disadvantage of that solution that in the case of a defect of the interrogation transmitter no tire pressure monitoring will occur.

Now, it is the object of the present invention to open up a way how to achieve reliable tire pressure monitoring in a low-cost way, while preserving long service lives for the batteries.

This object is achieved by a method having the features defined in claim 1. Advantageous further developments of the invention are the subject matter of the sub-claims.

The method according to the invention makes use of the advantages of a tire pressure monitoring system having an interrogation transmitter as disclosed in DE 199 39 936 A1 without, however, accepting the disadvantages of that publication. As long as the interrogation transmitter is intact, the interrogation signals will cause the wheel electronics to send out information on the pressure or a change of pressure in the tire. However, once no interrogation signals are received—for whatever reason—the wheel electronics will at the end of a predetermined period of time adopt a second mode of operation in which transmission will be effected at an internally established transmission rate. That transmission rate either may be firmly preset, or may be variable and be internally established using physical values measured by the wheel electronics, for example as a function of the pressure or of the speed at which pressure changes take place, or as a function of the vehicle speed (speed of the wheel).

It is an especial advantage of the invention that the method according to the invention, while making use of the advantages of the interrogation transmitter with a view to achieving especially energy-saving operation, does not depend on such an interrogation transmitter for achieving reliable monitoring of the tire pressure. Thus, uninterrupted monitoring of the tire pressure is possible with advantage even in the event of a defect of the interrogation transmitter. Especially, a wheel electronics unit using the method according to the invention can be used on both vehicles with an interrogation transmitter and vehicles without an interrogation transmitter, without any changes or adjustments being required. While heretofore different wheel electronics systems were required for vehicles with an interrogation transmitter according to DE 199 39 936 A1 and vehicles without an interrogation transmitter, it is now sufficient to produce a single configuration of wheel electronics for both applications. Accordingly, there is no need in future to convert the production process for adapting it to different types of wheel electronics. Instead, production can be concentrated on a single configuration of wheel electronics, and the production numbers can be increased. This in turn leads to lower production costs and facilitates the logistics and store-keeping functions. In addition, it is an advantage that workshops, instead of being required to keep on store different types of wheel electronics, can concentrate on a single configuration that fits all types of vehicles, whether with or without an interrogation transmitter, and that can be installed blind, so to say.

Preferably, the pressure or change of pressure is measured according to an internal program in a first mode of operation. Although it will of course be sufficient to carry out a single pressure or pressure-change measurement in response to an interrogation signal, repeated measurements provide the advantage of allowing a more reliable information on the pressure or the change of pressure to be obtained, for example for the purpose of deriving the average of several values measured. Preferably, the measurements performed in the first mode of operation are carried out independently of the interrogation signal, for example always at a fixed interval of 1 s, for example. This feature provides the advantage that the wheel electronics are always provided with current information on the pressure or pressure changes, and are in a position to send out such information directly after receipt of an interrogation signal. Preferably, the same measuring rates are employed for the first and the second modes of operation. The energy consumption connected with the pressure or pressure-change measurement is substantially lower than the energy consumption connected with the transmitting operation. However, different measuring rates for the first and the second modes of operation are of course also possible.

An advantageous further development of the invention provides that the first control signal is derived from the action of unlocking the vehicle. With the vehicle in the parked condition, there is no need for permanently monitoring the tire pressure. It is then sufficient if information on the condition of the tire is signalled at the beginning of the next travel. If the wheel electronics are then set to the first mode of operation by a first control signal derived from the action of unlocking the vehicle, first information on the condition of the tire can already be obtained, by interrogation of the wheel electronics, during the period of time usually elapsing between the actions of unlocking and of starting the vehicle. Preferably, a signal of a radio key or a signal derived therefrom is used as a first control signal.

An advantageous further development of the invention provides that an electric signal, causally derived from rotation of the wheel, is derived in the wheel electronics and is used for controlling the transmission rate in the second mode of operation. A pressure drop in a vehicle tire is much more dangerous at high vehicle speed than at low vehicle speed. When a vehicle is parked or is moving at slow speed, the transmission intervals may therefor be significantly longer than when the vehicle is moving at fast speed, so that transmission energy can be saved in this manner. Preferably, transmission is effected at time intervals T0 of 54 seconds, for example, when a minimum speed is exceeded, or at longer time intervals of 15 minutes, for example, when a minimum speed is reached or in the stationary condition of the vehicle. Although, preferably, the two minimum speeds are equal, they may also deviate one from the other by hysteresis. Preferably, the signals derived from rotation of the wheel are used for varying the time interval T0. It is possible in this way, for example, to increase the transmission rate as speed rises. Signals derived from rotation of the wheel can be obtained for this purpose for example by means of a centrifugal sensor provided as part of the wheel electronics, whose signal is modulated by gravity in proportion to the speed of the wheel, as disclosed in WO 01/69265 A1. A switch responsive to rotation of the wheel, which simply detects the condition that a minimum speed has been reached and then causes transmission to be effected at time intervals reduced from T1 to T0 is connected with less apparatus input.

Another advantageous further development of the invention provides that the pressure or pressure change signals are evaluated in the wheel electronics and that the transmission rate is adjusted in the second mode of operation in response to the speed of the pressure changes. When the wheel electronics determine that a rapid pressure change is taking place, where a predetermined threshold value of the pressure change of, for example, 0.2 bar/min is exceeded within a predetermined period of time, then the transmission rate will be increased. This feature provides the advantage that the transmission rate can be comparatively lower in the case of a slow, creeping pressure drop or when pressure remains constant, without a risk that this may lead to a loss of safety, because a dangerous rapid pressure drop can nevertheless be signalled to the driver of the vehicle immediately. Preferably, in a first mode of operation the wheel electronics will signal a pressure change when a predetermined threshold speed value is exceeded, without waiting for an interrogation signal. Such transmission need not necessarily occur immediately after the first measured value indicating that the pressure is dropping rapidly has been received. Rather, in order to improve reliability, it is advantageous for this purpose to first derive an average of several measured values, for which purpose the measuring rate is increased, for example from 1 measurement per 3 seconds to 1 measurement per 0.8 seconds. It is thus possible with advantage to immediately signal to the driver of the vehicle any dangerous rapid pressure drop, and this both in the first and in the second modes of operation. Although, it would be generally sufficient in this case for the wheel electronics to transmit a signal once a rapid pressure drop has been determined, without waiting for an interrogation signal, it is, however, preferred that in the case of a rapid pressure drop the wheel electronics will transmit signals at a rapid transmission rate in both the first and the second modes of operation.

According to another advantageous further development of the invention it is provided that the wheel electronics can be set, by a third radio control signal received from outside of the wheel electronics, to a third mode of operation, in which it does not transmit any signals whatever until it leaves that third mode of operation again in response either to a first control signal or to the fact that a minimum vehicle speed has been reached, and adopts the first or the second mode of operation. Preferably, pressure or pressure changes are likewise no longer measured in that third mode of operation. The third mode of operation is, therefore, characterised by extremely low energy consumption. Thus, it is especially well suited for storage of the wheel electronics, for example in workshops. In order to permit the wheel electronics to be stored in an especially energy-saving way, they can be set to the especially energy-saving third mode by means of a hand-held device capable of transmitting the third control signal. However, the third mode of operation is also suited for parked vehicles. The third control signal can be derived with advantage from the action of switching off the motor or locking the vehicle, for example. Based on the first control signal, which preferably can be derived from the action of unlocking the vehicle, or—if no first control signal is received—once the minimum speed, which may be determined for example by means of a roll switch as described above has been reached, the wheel electronics of a parked vehicle will then leave that third mode of operation and adopt the first or second mode of operation. Whether the wheel electronics change from the third mode of operation to the first or to the second mode of operation when the minimum speed is exceeded is in fact not really important as the wheel electronics will anyway change over from the first mode of operation to the second mode of operation if no interrogation signal is received.

Further details and advantages of the invention will be described hereafter by way of one embodiment of the invention, with reference to the attached drawings.

FIG. 1 shows a section illustrating a storage mode and the third mode of operation;

FIG. 2 shows a section illustrating the second mode of operation; and

FIG. 3 shows a section illustrating the first mode of operation.

Figure 1:
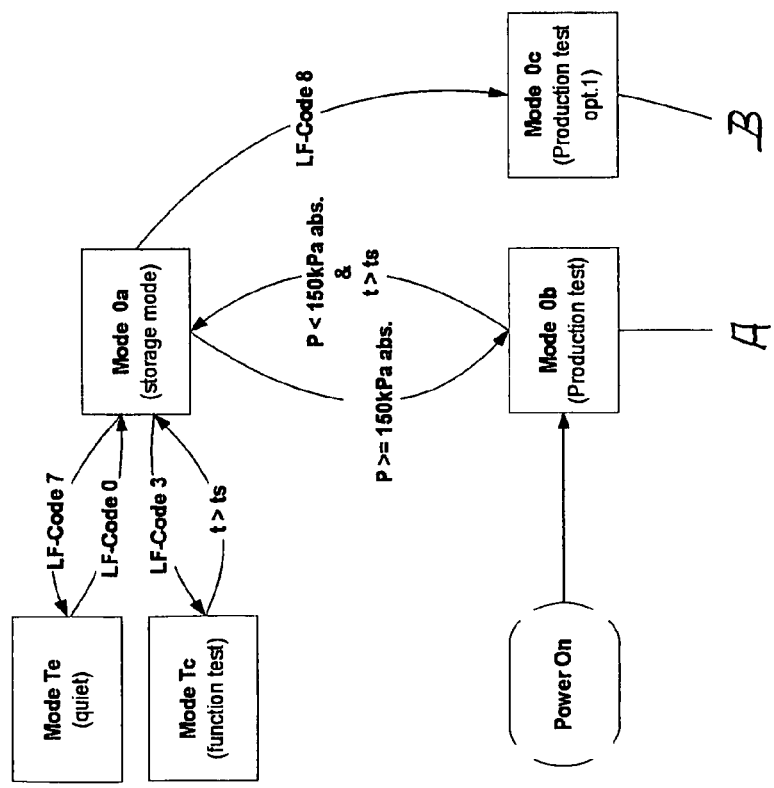
FIGS. 1 to 3 show sections of a flow diagram of the method according to the invention.
Figure 2:
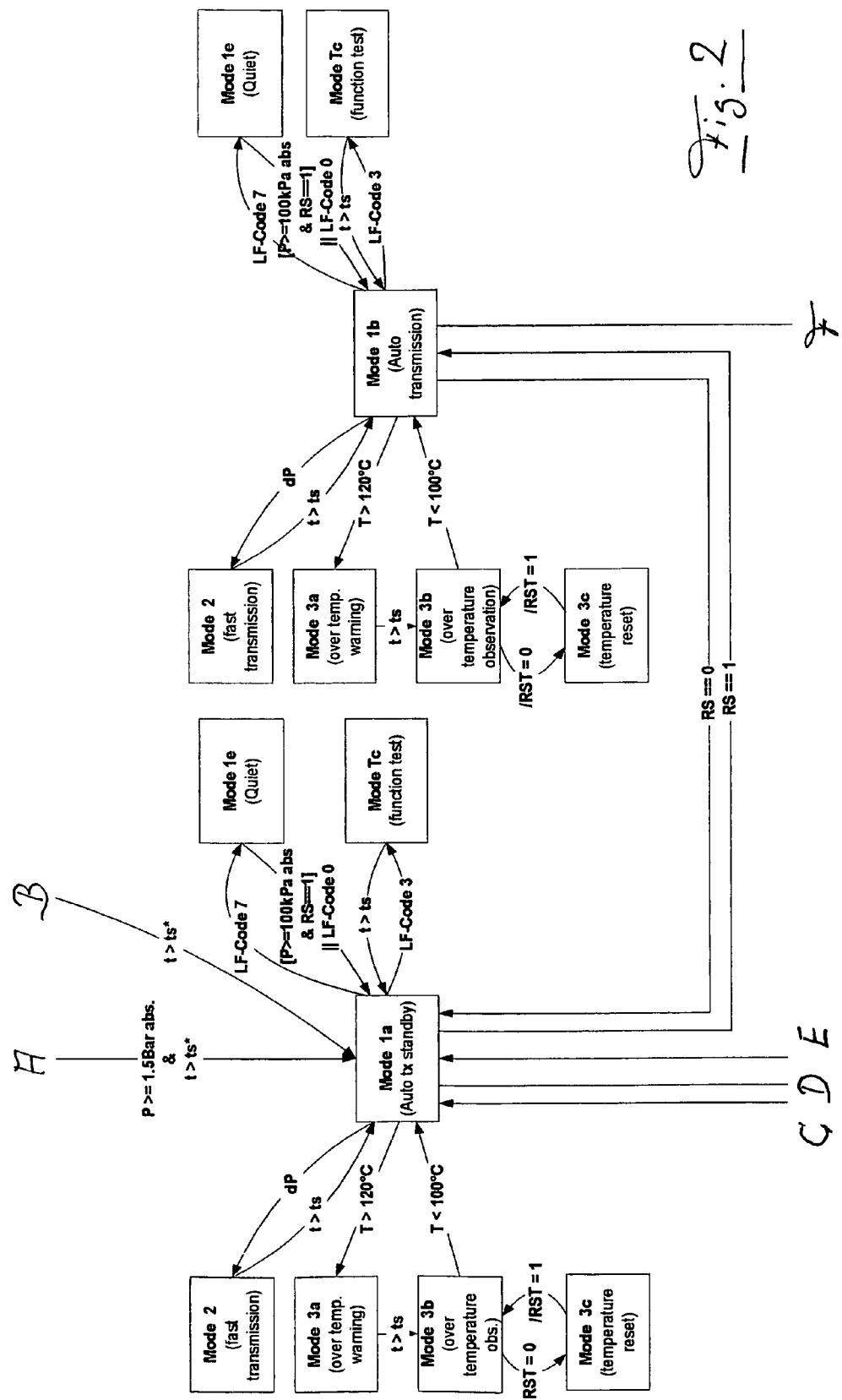
Figure 3:
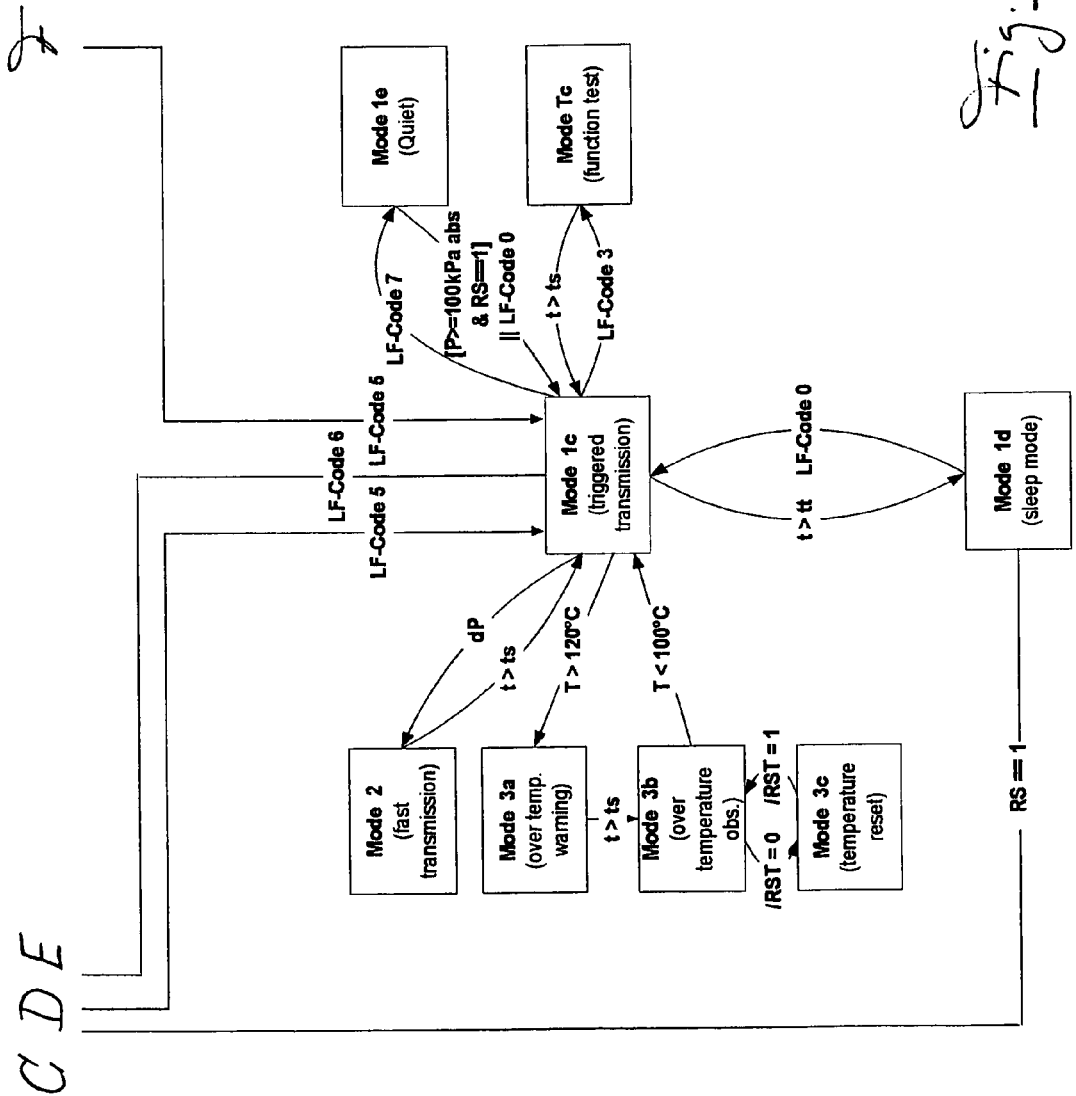

The sections of the flow diagram shown in FIGS. 1, 2 and 3 should be assembled so that the lines identified by the same capital letters A, B, C, D, E and F, respectively, abut each other.

Before the wheel electronics are started up for the first time, they rest in a storage mode which is identified as mode 0a in FIG. 1. In that storage mode, no transmission is effected, only pressure is measured at periodically recurring time intervals. When pressure is determined to rise above a predetermined threshold value, for example 1.5 bar, in that storage mode, the wheel electronics are activated and are transferred to the second mode of operation comprising the sub-modes 1a, 1b and 2 as shown in FIG. 2. In that second mode of operation, pressure is measured at time intervals t0 of, for example, three seconds, and a signal containing information on the pressure or a change of pressure is sent out at time intervals T0. The transmission rate T0 depends on the driving speed of the vehicle. Once a predetermined minimum speed of, for example, 25 km/h is exceeded, the time intervals between transmission of the pressure data of, for example, 15 minutes in sub-mode 1a is reduced to 54 seconds in sub-mode 1b. Preferably, a switch responsive to the rolling motion serves to determine if the predetermined minimum speed has been exceeded. The fact that the minimum speed has been exceeded results in the switch being closed, which is indicated by RS=1 in FIG. 2, and thus in a faster transmission rate. When the vehicle is moving slowly, or in the stationary condition of the vehicle, the switch is open which is indicated by RS=0 in FIG. 2 and which leads to a slower transmission rate.

When the wheel electronics receive the first control signal they adopt a first mode of operation in which information on the pressure or a pressure change is transmitted in response to an interrogation signal. The first mode of operation is illustrated as mode 1c in FIG. 3, and the first control signal may be the signal indicated by LF code 5 or the signal indicated by LF code 0. If no such signals are received, the wheel electronics, at the end of a predetermined period of time tt of, for example, 1 to 2 minutes, will return to the second mode of operation the respective sub-mode of which is indicated as mode 1d in FIG. 3. This guarantees that reliable tire-pressure monitoring is ensured even if the interrogation transmitter should be damaged. Preferably, the first control signal by which the wheel electronics are transferred to the first mode of operation is triggered by the action of unlocking the vehicle door. The first pressure-measuring data may be obtained already in the period of time between unlocking of the vehicle door and starting of the driving motion to that a warning regarding an excessively low tire pressure will be available before the vehicle starts running.

In case a rapid pressure drop is determined by the wheel electronics transmission is effected internally at shorter time intervals and, preferably, the measuring rate is increased in both the first and the second modes of operation. If a rapid pressure drop is detected, this will lead to an increased transmission rate not only in the second mode of operation, but also in the first mode of operation. The corresponding sub-mode is illustrated as mode 2 in FIGS. 1 and 3.

In order to permit energy consumption to be further reduced, the wheel electronics may be transferred, by a third external control signal indicated as LF code 7 in the Figures, to a third mode of operation indicated as mode 1e in FIGS. 1 to 3. In that third mode of operation, pressure measurements are no longer carried out, and signals are not transmitted either. An external control signal, indicated as LF code 0 in the Figures, can then return the wheel electronics from that third mode of operation, which is especially favourable for longer times of storage, to the mode of operation it has been in before, i.e. to the storage mode, the first or the second mode of operation. When the wheel electronics had been set to the energy-saving third mode from the first or second mode, it is preferably set back to that second mode when the switch responds to rolling of the wheel so that reliable monitoring of the tire pressure is in any case ensured.

In addition to the tire pressure, the wheel electronics preferably also permanently detect the temperature in the tire and incorporate the latter in their evaluation of the measured signals. Given the fact that tire pressure naturally increases as temperature rises, it is possible in this way to prevent any unnecessary warning regarding excessively high or low tire pressure values and to improve the quality of the tire-pressure monitoring function. Trouble-free operation of the wheel electronics, which usually comprise an ASIC or a microprocessor, is no longer guaranteed above a given material-dependent threshold temperature. It is for that reason that, conveniently, the wheel electronics get inoperative in both the first and the second modes of operation when a predetermined threshold temperature of, for example, 120° Celsius is exceeded. The respective modes are indicated as modes 3a, 3b and 3c in FIGS. 2 and 3. When the temperature drops below another threshold temperature of, for example, 100° Celsius the wheel electronics are rendered active again, for example by a PTC thermistor provided as part of the wheel electronics. In order to avoid unnecessarily frequent switching operations, caused by minor temperature variations, it is convenient to set the second threshold temperature at a somewhat lower level compared with the first threshold temperature.

A forth control signal, indicated as LF code 3 in FIGS. 1 to 3, can set the wheel electronics to a test mode Ic. In that condition, repair and maintenance work as well as function tests to be performed as a quality control measure before installation of the system can be carried out.

A considerable advantage of such wheel electronics operating according to the method described with reference to FIGS. 1 to 3 now resides in the fact that although it is absolutely possible to make use of the advantages of an interrogation transmitter with a view to achieving an especially comfortable and energy-saving tire-pressure monitoring system, reliable tire-pressure monitoring is possible also in a vehicle without any such interrogation transmitter. It is sufficient, for both vehicles with or without an interrogation transmitter, to produce and keep on store only one configuration of a wheel electronics unit.

As has been described before, the wheel electronics are initially in their storage mode (mode 0a), before they are put in operation for the first time. Starting out from that storage mode, the wheel electronics are activated once pressure is detected to rise above a predetermined threshold value, indicated as a pressure of 1.5 bar in FIG. 1. In the storage mode, the wheel electronics therefore measure the pressure at periodically recurring time intervals. Although no signals whatever are transmitted in the storage mode, even the energy consumption connected with the periodic pressure measurements constitutes a drain on the battery of the wheel electronics—especially in the case of extended storage periods. In order to nevertheless be able to store the wheel electronics over extended periods of time, without reducing the service life of the battery in subsequent operation, it is provided that the wheel electronics can be set, via an external signal indicated as LF code 7 in FIG. 1, from its storage mode to a third mode of operation (mode 1e) in which there is no transmission and no measuring operation, either. The external control signal, by which the wheel electronics can be set to that energy-saving third mode of operation can be transmitted for example by means of a hand-held device.

Now, when a wheel electronics unit in its third mode of operation is supplied with pressure values prevailing inside a tire, it is not activated by that fact alone because no pressure measurements are effected in that operating mode. In order to be activated, the wheel electronics must first be set back to their storage mode in which pressure measurements are carried out. This may be effected, for example, by means of a hand-held device by transmission of a corresponding control signal, indicated as LF code 7 in FIG. 1. When the wheel electronics leave the described third mode of operation, they always return to their last mode they were in immediately before they were transferred to the third mode. If, for example, the wheel electronics had been transferred to the third mode of operation from the storage mode, they can be set back from the third mode of operation to no other mode than the storage condition.

Normally, the wheel electronics should be activated before being installed in a tire on a vehicle. However, it may of course happen that a wheel electronics unit, which had been transferred from the storage mode to the third mode of operation, is installed on a vehicle in that condition. In order to permit tire pressure to be monitored in this case as well, the wheel electronics comprise a roll switch for setting back the wheel electronics from the third mode of operation to their previous mode of operation, for example the storage mode, once a predetermined minimum speed is exceeded. When a pressure above the predetermined threshold value is then detected by the wheel electronics in their storage mode, they adopt the sub-mode 1a of the second mode of operation. However, instead of changing over directly from the storage mode to the second mode of operation, the wheel electronics pass through an intermediate mode defined as mode 0b. In that intermediate mode function tests can be carried out. In addition, intermediate mode 0b serves to prevent activation of the wheel electronics on the basis of a single defective measuring result. It is for this purpose that pressure is measured repeatedly in intermediate mode 0b. Only when such measurements reveal that the predetermined threshold pressure value is exceeded for a predetermined period of time will the wheel electronics change over from intermediate mode 0b to sub-mode 1a of the second mode of operation; otherwise they will return to their storage mode.

Thus, while a vehicle without an interrogation transmitter needs to have a roll switch in the wheel electronics in order to permit the tire to be monitored in any case, this is not so for a vehicle equipped with an interrogation transmitter.

For, the interrogation transmitter is caused to send out a first control signal by the action of unlocking the vehicle door. In this context the term first control signal is meant to describe any control signal that sets the wheel electronics to their first mode of operation, either directly or indirectly. In the embodiment illustrated in FIGS. 1 to 3, a first control signal may therefore consist of the control signals indicated as LF code 0 and LF code 5, or may include one or both of such control signals. In the case of the described embodiment, the first control signal triggered by unlocking of the vehicle door contains the signals indicated as LF code 0 and LF code 5. When the wheel electronics were in their third mode of operation at the time a vehicle door was unlocked, they are therefore transferred by the first control signal to their previous mode, i.e. in the described case to their storage mode. Now, when the tire pressure is found to exceed the predetermined threshold value, the wheel electronics are then set, by that part of the control signal which is identified as LF code 5, to the first sub-mode 1c of the first mode of operation, via intermediate mode 0b and sub-mode 1a of the second mode of operation.

Preferably, unlocking of a vehicle door triggers not only a single transmission of a first control signal, but rather a repeated transmission thereof. This generally improves the reliability of the system. It is especially preferred in this connection if the first control signal also includes a string indicated as LF code 8 in FIG. 1. When such a string is received by the wheel electronics, in their storage mode, they adopt sub-mode 1a of the second mode of operation, irrespective of the pressure value measured. That part of the first control signal, which is indicated as LF code 5 in FIG. 3, causes the wheel electronics to then adopt their first mode of operation and to transmit data regarding the tire pressure, or a change of tire pressure, in response to an interrogation signal.

The advantage of an interrogation transmitter is seen, among other things, in the fact that the measured pressure data can be inquired already during the time between the moment a vehicle door is unlocked and the moment the vehicle starts moving, and that a warning regarding an excessively low tire pressure can be emitted, if necessary, already when the vehicle is being started.

During the running period of the vehicle that follows, the wheel electronics mounted in the tires of the vehicle are then caused at regular intervals, by corresponding interrogation signals, to transmit information on the pressure or on pressure changes in the tire. Preferably, the interrogation signals are sent out at shorter time intervals when the vehicle is moving at fast speed than when it moves at slow speed. In this way, current information on the pressure, or a change of pressure, is made available at shorter time intervals when the vehicle moves at fast speed. At fast speed, any pressure drop in a tire would be much more dangerous than at slower speed. Accordingly, the interrogation intervals, and correspondingly the transmission intervals, may be considerably longer at slow speed than at fast speed so that transmission energy can be saved in this way.

If the wheel electronics determine by two successive measurements that the tire pressure has dropped by more than a predetermined value, i.e. that a rapid pressure drop has occurred, the internal measuring rate will be increased. For example, the pressure then will be no longer measured at intervals of three seconds, but already at intervals of 0.3 seconds. If this confirms the rapid pressure drop the wheel electronics will transmit a signal regarding the pressure or the pressure variation in their first mode of operation without waiting for the receipt of an interrogation signal. A rapid pressure drop in movement of the vehicle is extremely dangerous and should, therefore, be signalled to the driver of the vehicle at the earliest possible time.

When a vehicle equipped with an interrogation transmitter is parked, interrogation signals are no longer sent out. When interrogation signals are no longer received by the wheel electronics they will switch over to sub-mode 1d of the second mode of operation at the end of a predetermined period of time tt, for example at the end of one to two minutes. Normally, measuring and sending are not necessary in a parked vehicle equipped with an interrogation transmitter since the interrogation transmitter will be reactivated before the vehicle starts moving again, for example for transmitting the first control signal triggered by unlocking of a vehicle door. When interrogation signals are no longer received, the wheel electronics could therefore normally change over from mode 1c of the first mode of operation to the third mode of operation in which no measuring and no transmission occurs any more. However, in order to achieve the best possible reliability of the tire pressure monitoring function, the wheel electronics will continue their measurements at time intervals t0 and continue to send information regarding the pressure or any pressure variation at time intervals T0 also with the vehicle in parked condition, i.e. in sub-mode 1d of the second mode of operation.

In the case of a vehicle without an interrogation transmitter, the wheel electronics will be transferred, as described above, from their storage mode to sub-mode 1a of the second mode of operation. This mode of operation largely resembles sub-mode 1d of the second mode of operation since in sub-mode 1a of the second mode of operation the tire pressure is likewise measured at time intervals t0, and a corresponding signal containing information on the pressure or any pressure variation is transmitted at time intervals T0. Sub-mode 1a of the second mode of operation is assumed by the wheel electronics of a vehicle without an interrogation transmitter in the parked condition of the vehicle and when the vehicle is driving at slow speed. When a predetermined minimum speed of, for example, 25 km/h is exceeded, the wheel electronics are set, by response of the roll switch, to sub-mode 1b of the second mode of operation. In sub-mode 1b of the second mode of operation, the time intervals for the transmission of pressure data of, for example, 15 minutes in sub-mode 1a are reduced to 54 seconds. It is thus possible with advantage to adopt the transmission rate to the driving speed even when an interrogation transmitter is not present or not operative, so that transmission energy can be saved. When the wheel electronics detect a rapid pressure drop in the second mode of operation, then the measuring rate and the transmission rate are increased.

When a tire equipped with wheel electronics has been changed from a vehicle equipped with an interrogation transmitter to a vehicle without such an interrogation transmitter, then the wheel electronics will first adopt sub-mode 1d of the second mode of operation. However, once the vehicle starts running and the roll switch detects that the predetermined minimum speed is exceeded, the wheel electronics will then change over to sub-mode 1a of the second mode of operation and from there, if necessary, to sub-mode 1b of the second mode of operation. In this way, uninterrupted monitoring of the tire pressure can be guaranteed even when a tire is changed or in the event of a sudden defect of the interrogation transmitter.

The invention claimed is:

1. Method for operating a wheel electronics for monitoring and wireless signaling a pressure or a pressure change in pneumatic tires of wheels on vehicles, wherein the pressure prevailing in the pneumatic tire is measured and electric pressure signals are derived from such measurements, and an information signal containing information on the pressure or on a pressure change is transmitted, the information signal being intended to be received by a receiver provided in or on the vehicle, the wheel electronics being set by a first control signal, which is transmitted in wireless fashion from outside the wheel electronics, to a first mode of operation in which the prevailing pressure or a pressure change is measured and signaled in response to the receipt of an interrogation signal generated outside the wheel electronics and transmitted to the wheel electronics in wireless fashion, and, if the wheel electronics do not receive another interrogation signal within a predetermined period of time after receipt of an interrogation signal, the wheel electronics adopting itself a second mode of operation in which the pressure or a pressure change is measured repeatedly and is transmitted at a transmission rate which is firmly preset or is variable and which is established in the wheel electronics for that second mode of operation.

2. The method as defined in claim 1, wherein the first mode of operation the pressure or the pressure change is measured repeatedly based on an internal program.

3. The method as defined in claim 2, wherein the first mode of operation measurements are carried out independently of the interrogation signals.

4. The method as defined in claim 1, wherein the measurings are taken at the same rates for the first and second modes of operation.

5. The method as defined in claim 1, wherein the first control signal is derived from an action of unlocking the vehicle.

6. The method as defined in claim 5, wherein a signal of a radio key, or a signal derived therefrom, is taken as the first control signal.

7. The method as defined in claim 1, wherein the wheel electronics are set to the second mode of operation also by a second control signal derived from switching off the motor or from locking the vehicle.

8. The method as defined in claim 1, wherein an electric signal is derived from rotation of the wheel and the signal so obtained in the wheel electronics is taken for controlling the transmission rate in the second mode of operation.

9. The method as defined in claim 8, wherein in the second mode of operation the wheel electronics send out signals at time intervals T0 when a minimum speed of the vehicle has been reached, and when the speed drops below a minimum speed or when the vehicle is not moving the wheel electronics send out signals at time intervals T1>T0.

10. The method as defined in claim 9, wherein the electric signals derived from rotation of the wheel are taken to vary the time intervals T0.

11. The method as defined in claim 1, wherein the signals indicating a pressure or a pressure change are evaluated in the wheel electronics and that in the second mode of operation the transmission rate is adjusted in response to the speed of a pressure change.

12. The method as defined in claim 11, wherein the transmission rate is increased when the speed at which the pressure changes exceeds a threshold value.

13. The method as defined in claim 11, wherein in the first mode of operation the wheel electronics do transmit a signal when the speed of a pressure change exceeds a given threshold value, without waiting for an interrogation signal.

14. The method as defined in claim 9, wherein the wheel electronics is set, by a third control signal generated outside the wheel electronics and transmitted to it in wireless fashion, to a third mode of operation in which it does not transmit signals at all until it is caused to leave the third mode of operation again and to return to the first or the second mode of operation by receiving of a first control signal or by reaching the minimum speed of the vehicle.

15. The method as defined in claim 14, wherein neither a pressure nor a pressure change is measured in the third mode of operation.

16. Method for operating a wheel electronics device for monitoring and wireless signaling of a pressure or a pressure change in pneumatic tires of wheels on vehicles, comprising the steps of:

receiving wirelessly a first control signal generated outside the wheel electronics device, setting the wheel electronics device to a first mode of operation in which the prevailing pressure or a pressure change is measured and signaled in response to an interrogation signal, receiving wirelessly the interrogation signal generated outside the wheel electronics device, measuring the pressure prevailing in the pneumatic tire or a pressure change, deriving an electric pressure signal from the pressure measurement, transmitting an information signal containing information on the pressure or on a pressure change, the information signal being intended to be received by a receiver provided in or on the vehicle, and if the wheel electronics device does not receive another interrogation signal within a predetermined time after receiving the interrogation signal, setting automatically the wheel electronics device to a second mode of operation in which the pressure or the pressure change is measured repeatedly and is transmitted at a firm or variable transmission rate.

17. The method as defined in claim 16 comprising the further steps of:

measuring the pressure or the pressure change repeatedly when the wheel electronics device is in the second mode of operation and transmitting the measured pressure or pressure change repeatedly when the wheel electronics device is in the second mode of operation.

18. The method as defined in claim 17 further comprising the steps of:

evaluating the information signals in the wheel electronics, determining a speed of the pressure change, and adjusting the transmission rate in response to the speed of the pressure change.

19. The method as defined in claim 17 further comprising the steps of:

receiving wirelessly a third control signal from outside the wheel electronics device, wherein when the wheel electronics device is in the third mode of operation information signals are not transmitted by the wheel electronics device.

20. The method as defined in claim 19 wherein no pressure nor pressure change is measured by the wheel electronics device while the wheel electronics device is in the third operating mode.

* * * * *